2,801,211
PURIFICATION OF ETHANOL

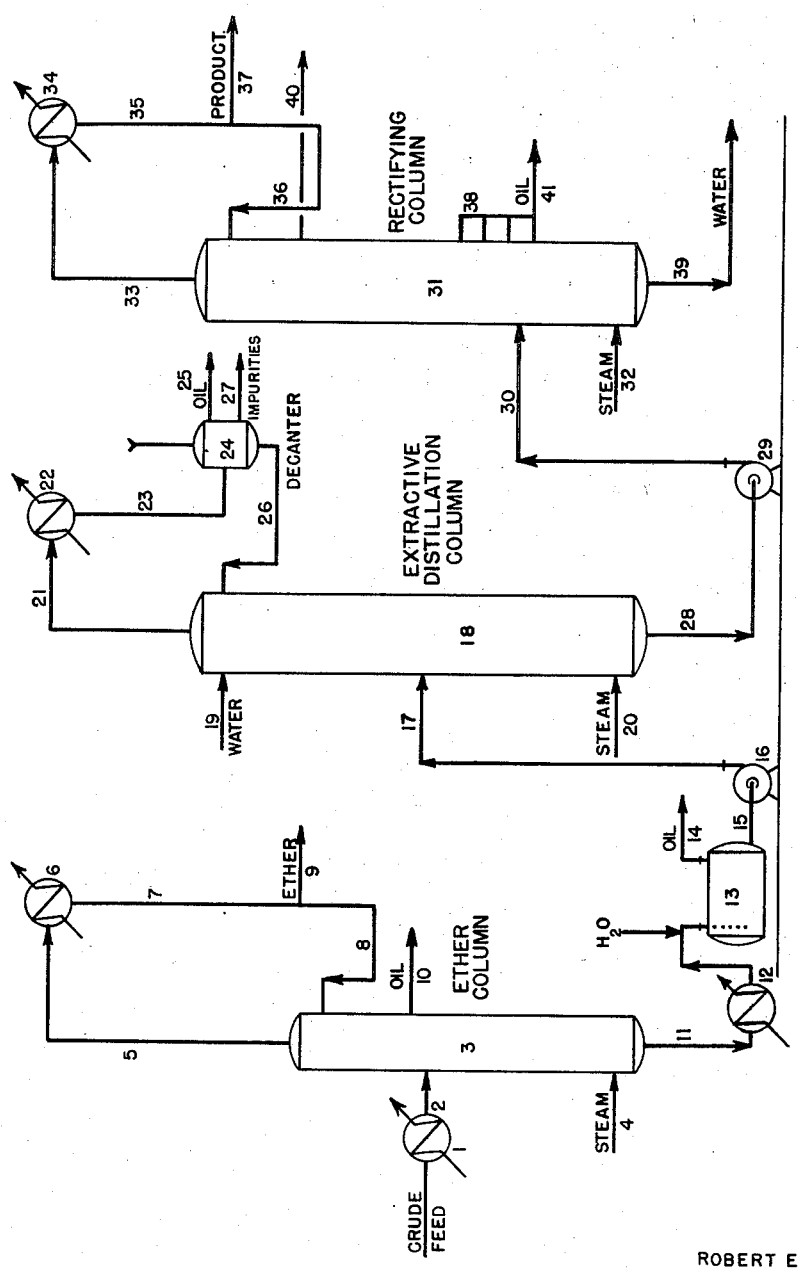

Robert E. Hulse, Darien, Conn., and John S. Atwood, Port Washington, and Werner C. Muller, Roslyn, N. Y., and Franklyn D. Miller, Cincinnati, Ohio, assignors to National Petro-Chemicals Corporation, New York, N. Y., a corporation of Delaware Application October 12, 1954, Serial No. 461,781

2 Claims. (Cl. 202—39.5)

This invention relates to a practical, commercial process for the purification of crude aliphatic alcohols produced by the hydration of mono-olefins. More specifically, the invention relates to a process whereby a malodorous alcohol produced by the hydration of mono-olefins is processed to remove impurities boiling below the boiling point of the alcohol being purified, impurities boiling in the same range as the alcohol, and impurities boiling considerably above the alcohol. It is of especial importance that the process herein described, in one integrated operation, recovers the crude by-products especially the diethyl ether and removes the malodorous impurities.

This invention provides an effective process in which both water-soluble and water-insoluble impurities, including odor-producing contaminants, are removed from alcohols produced by the hydration of olefins. The process of this invention is especially useful for the production of high quality, substantially odorless aliphatic alcohols, particularly ethanol.

Further, this invention provides an improved process for the refining and purification of crude ethanol obtained by the catalyzed hydration of ethylene in which the crude ethanol is subjected to a preliminary distillation to remove, as an overhead stream, lower boiling impurities and in particular diethyl ether, prior to the removal of higher boiling impurities by a water extractive distillation of the partially purified aqueous alcohol. More specific details and features of the invention will become apparent from the description given below.

By the catalyzed hydration of olefins is meant those processes in which the mono-olefins are hydrated in the presence of a catalyst, including both the acid catalyzed processes wherein mono-olefins and mixtures thereof are hydrated in the presence of polybasic mineral acid-acting acids such as sulfuric acid, phosphoric acid, and benzene-sulfonic acid, and those processes, of the direct hydration type, in which the olefin is hydrated in the presence of solid catalysts such as phosphoric acid, phosphoric acid-tungsten oxide and the like. The most common commercial process is one in which ethylene is absorbed in strong sulfuric acid to yield an absorbate containing monoethyl sulfate and diethyl sulfate esters. Said absorbate is diluted and hydrolyzed, and a crude aqueous ethanol mixture is separated therefrom.

Operating according to the process of this invention, excellent yields of highly purified alcohol can be produced for use in industries requiring odor-free solvents. These include extensive uses in the cosmetic, perfume, drug, biological and vitamin industries.

It is will known that alcohols produced by the above outlined methods, and especially those produced by sulfuric acid hydration of olefins, possess to a more or less degree a distinct and foreign odor, slightly penetrating and for the most part disagreeable. Although it is not intended to ascribe the disagreeable odor of these alcohols to the presence of any one or to any combination of chemical compounds, it is definitely known that the odors of the crude alcohols depend largely on the quality of the starting material, that is, the purity of the olefin stream employed in the olefin hydration operation. Likewise, the odor of a refined alcohol depends to a similar extent on the quality of the crude alcohol from which it is originally prepared. Thus, a rather wide range of variations in purity and odor characteristics is possible for synthetic ethanol products.

Olefin hydrocarbons, such as those produced by the cracking of mineral oils, fuel oils, kerosenes, petroleum residues, hydrocarbon gases, and the like, contain variable amounts of compounds having an obnoxious odor, particularly compounds containing chemically bound sulfur such as hydrogen sulfide, alkyl sulfides, mercaptans, etc. These materials, even when present as traces in the olefinic stream fed to the acid hydration process, contribute heavily to the obnoxious odor of the crude alcohol. Although pure elemental sulfur itself has no odor, when it is present in combination with other elements, it produces powerful odoriferous agents. The bad odor of alcohols has also been at least partially attributed to the presence of the so-called polymer products of wide boiling range which are formed by side reactions during the acid catalyzed olefin hydration process. The odor of these polymerized products is further accentuated by the presence of any sulfur compounds contained therein, although the odor of some pure polymers is, by itself, somewhat unpleasant. It has been further demonstrated that obnoxious odors in some product alcohols can be directly attributed to the decomposition of these polymers during distillation. It is also possible that the presence of traces of nitrogen compounds contributes to the odor of the crude alcohols.

In order to show the number and diversity of the impurities usually present in alcohols produced by catalyzed hydration processes, the following analysis is presented. It is given for a sample of crude ethanol produced by the sulfuric acid hydration of ethylene, the proportions given being based on an anhydrous alcohol basis.

*Crude alcohol analysis (anhydrous basis)*

| Component | Weight percent |
|---|---|
| Ethanol | 88.0. |
| Ether | 11.25. |
| Ketones | Trace. |
| Hydrocarbons | 0.45. |
| Higher alcohols | Trace. |
| Sulfur compounds | 3 p. p. m. as sulfur. |
| Polymer materials | 0.30. |

A typical ASTM standard distillation of a sample of the polymer product, resulting from the production of ethanol by the sulfuric acid hydration of ethylene, is as follows:

*Polymer oil (ASTM standard distillation)*

| | Temp. °F. |
|---|---|
| Initial boiling point | 211 |
| 5% | 412 |
| 10% | 419 |
| 20% | 428 |
| 30% | 435 |
| 40% | 441 |
| 50% | 450 |
| 60% | 459 |
| 70% | 469 |
| 80% | 490 |
| 90% | 512 |
| 95% | 545 |
| End point | 558 |

Recovery—96%.

Thus, regardless of exact causes, it has been found that the crude ethanol produced by the sulfuric acid hydration of ethylene contains malodorous impurities which are peculiar to products from the hydration process, including water, ethers, ketones, other higher alcohols, hydrocarbons, sulfur and nitrogen compounds, and various polymer oils having more or less complex chemical structures.

Until recently, commercial crude aqueous ethanol resulting from the acid hydration of ethylene was purified by the general method outlined below. The crude aqueous alcohol was diluted with additional water in an attempt to throw out of solution a portion of the water insoluble impurities. Any resulting layer of insoluble impurities was separated. The remaining aqueous alcohol was then subjected to a distillation in a rectification column, wherein some of the low boiling impurities, including the major portion of the ethers, and some of the light hydrocarbons were removed overhead. The aqueous alcohol bottoms fraction from this rectification column was sent to a second rectification column from which various fractions were removed either overhead or as side streams. For example, a cut containing heavy polymer oils, ethanol, and water was removed at a point somewhat below the feed plate; another cut containing lighter polymer oils, ethanol, and water was removed at a point above the feed plate; an overhead cut containing volatile impurities and polymer decomposition products was removed from the top of tower, while the product alcohol itself was recovered as a side stream removed at a point a few plates from the top of the tower. This type of operation has been shown to give unsatisfactory alcohol. It gives final ethanol fractions having bad odor characteristics of more or less intensity depending on the composition and properties of the starting alcohol fraction.

More recently, it has been further suggested that the crude aqueous alcohol mixture containing the impurities as above described can be subjected to improved operation in which the crude aqueous ethanol fraction is fed to a water extractive distillation tower at an intermediate point, and in which controlled amounts of water are fed to the top of the tower or at a point near the top in sufficient quantity to reduce the concentration of ethanol in the internal liquid reflux to 2–60 weight percent. At these dilutions the volatility of the water insoluble impurities including ethers, ketones, higher alcohols, low molecular weight hydrocarbons, and the higher boiling polymer oils is enhanced to facilitate their removal.

Hydration of ethylene using sulfuric acid produces diethyl ether as a by-product in quantities of from 3 to 15 weight percent based on the ethanol produced. All of this ether is normally present in the feed stream to the above-mentioned extractive distillation tower. In addition, the other impurities are present, particularly the malodorous polymer oils having relatively high boiling ranges up to 480–660° F. These higher boiling materials are difficult, if not impossible, to remove by extractive distillation even in the presence of large amounts of water and under the most favorable operating conditions. Furthermore, the presence of relatively large amounts of ether in the column tends to alter adversely the solubility and volatility properties of these fractions and prevents their effective separation. The presence of the low boiling mutually soluble ether reduces the temperature in the upper zone of the tower and makes the removal of high boiling polymer oils virtually impossible. Consequently, they are retained with the dilute alcohol stream which is removed from the bottom of the extractive distillation column. These impurities have bad odor characteristics of both the hydrocarbon and sulfur types.

This dilute aqueous alcohol product recovered as a bottoms stream from the extractive distillation zone, and containing the odoriferous impurities as described above, is then ordinarily taken to a concentrating or rectifying column, wherein the alcohol is concentrated and recovered as an overhead fraction. The high boiling polymer oils present in the rectifying column undergo thermal degradation yielding relatively low boiling polymer oils, sulfur bearing materials and oxygenated organic compounds which are readily carried over into the alcohol overhead fraction and are present in the finished refined alcohol. Such alcohol has an obviously unpleasant odor.

A sample of polymer oil containing 350 p. p. m. of sulfur was added to refined alcohol and refluxed in a laboratory distillation column. A sample of alcohol drawn from the overhead shortly after refluxing was begun showed only a slight malodorous content. A sample of overhead drawn after 24 hours of refluxing was extremely malodorous and exhibited a sulfurous characteristic. The residual oil recovered from the charge was analyzed and showed only 285 p. p. m. of sulfur.

A sample of polymer oil containing 350 p. p. m. of sulfur was distilled to dryness under vacuum and yielded the following fractions:

| Fraction No. | Weight, gm. | Sulfur, p. p. m. |
|---|---|---|
| Cold trap | 2.6 | 722 |
| No. 1 | 6 | 210 |
| No. 2 | 12.8 | 154 |
| No. 3 | 14.3 | 144 |
| No. 4 | 4.2 | 526 |
| Residue | 1.6 | |

Thus the volatile decomposition product collected in a Dry Ice cold trap on the condenser vent contained the greatest concentration of surfur.

It has also been previously suggested as a further feature, that the crude aqueous alcohol be diluted prior to the extractive distillation step with additional amounts of water to throw out of aqueous solution a part of the polymer oil. This step is likewise unsatisfactory for this purpose, since in the presence of relatively large amounts of ether, the solubility of the polymer oils is increased and there is incomplete and unsatisfactory separation. Emulsion problems also present some difficulty in achieving an efficient decantation operation. Furthermore, when the ether by-product is separated and recovered as a crude fraction in this manner, it is badly contaminated by polymer oils and other products and difficult to purify.

According to the improvements comprising this invention, the total crude aqueous alcohol mixture containing all the impurities is used as feed. It will have the following general composition:

|  | Percent |
|---|---|
| Ether (weight) | 3–15 |
| Polymer oils | 0.1–2.0 |
| Alcohol | 40–70 |
| Water | 56.9–13 |

A mixture of the above general composition range is initially subjected to a fractional distillation. The crude alcohol solution is fed into a distillation tower of 30–60 plates at an intermediate point. The tower, which generally operates under 10–30 p. s. i. g. pressure to facilitate the condensing of ether, is heated by any suitable means. Temperature control within the column is maintained such that the temperature at the top of the column is between 120–140° F., and at the bottom, between 200 and 220° F. A reflux ratio in the range of 2:1 and 15:1 and preferably in the range of 4:1 to 10:1 is used. The vapor stream from the top of the column has the approximate composition of 98 weight percent ether, 1.5 percent water, together with traces of acetaldehyde and other low boiling impurities. This overhead fraction is condensed, a part of the liquid condensate is returned to the ether column as reflux, and a portion removed as crude diethyl ether. Light polymer oil impurities which are more volatile than aqueous ethanol may concentrate in the ether column at a point in the vicinity of the feed plate. These impurities are preferably removed from the column as a separate stream.

This impurities stream constitutes a relatively small portion of the total odor producing material in the crude ethanol.

The crude aqueous alcohol stream containing the remaining impurities, but substantially free of ether, is removed as a bottoms fraction and is subjected to a water extractive distillation operation. This bottom stream may contain about 60% alcohol, 39.5% water, and 0.5% impurities.

Preferably, however, it is first passed into a phase separator and further diluted with water to from 20 to 60 weight percent ethanol and preferably from 30 to 45 weight percent ethanol. The temperature in the decanter can be allowed to vary from 25 to 225° F. but is preferably controlled to 75 to 150° F. Since the mutual solvent diethyl ether has been removed, a sharp separation is obtained between the polymer oil impurities and the aqueous alcohol layer. An oil layer comprising the major remaining portion of the polymeric impurities including the malodorous materials is removed as an upper layer. The aqueous ethanol layer, now relatively free of odor bearing impurities and particularly free of thermally unstable polymeric oils which tend to decompose during later distillation operations, is withdrawn as a lower layer.

This aqueous ethanol mixture is then subjected to a water extractive distillation step. The ethanol containing mixture is fed to an intermediate point of a rectification tower. Sufficient water is added at the top of the tower, or at a point above the feed plate to reduce the concentration of ethanol in the internal reflux to 5 to 40 weight percent and preferably to 10 to 30 weight percent.

Since substantially all of the ether has been removed, the water present in the extractive distillation raises the active boiling temperature on the trays and causes the passage upward in the column of substantially all of the remaining organic impurities. These include particularly oxygenated impurities, sulfur compounds, and polymeric oils. Higher boiling oils which are subject to decomposition during subsequent distillation steps have previously been removed from the feed. Also, since substantially all of these compounds have been removed, the concentration of polymer oils at an intermediate point in the extractive distillation column is avoided. Removal of such a stream from the column as frequently required in past operations, is therefore unnecessary.

The preliminary removal of the ether and substantial amounts of other impurities, as described above, thus permits the efficient operation of the extractive distillation column. There is thus produced as a bottoms stream an aqueous ethanol stream containing 3 to 20 weight percent alcohol and substantially free of all odor producing impurities.

For instance, an aqueous bottoms stream of the following composition has been obtained using the above outlined purification steps.

*Extractive distillation column bottoms*

| | Wt. percent |
|---|---|
| Ethanol | 9.0 |
| Aldehydes | 0.0 |
| Ether | 0.0 |
| Oil | 0.005 |

This weak alcohol fraction is finally subjected to concentration in a rectifying column. The refined 95% alcohol is recovered as an overhead fraction or preferably as a top side stream. This product is entirely free of low boiling malodorous impurities and is entirely satisfactory as to odor characteristics. Analysis of typical samples of refined alcohol produced by this process is as follows:

| | Sample I | Sample II |
|---|---|---|
| Sp. Gr. | 0.8110 | 0.8101. |
| Acidity, Percent | 0.0016 | 0.001. |
| Clarity on Dilution | Clear | Clear. |
| Color APHA | <5 | <5. |
| Proof | 192.4 | 192.5. |
| Methanol | <200 p. p. m. | <200 p. p. m. |
| Non-Volatile Matter, Percent | 0.0014 | 0.0015. |
| Permanganate Time | >60 min | >60 min. |
| Solubility | Good | Good. |
| Isopropanol | <100 p. p. m. | <100 p. p. m. |
| Odor | Good | Good. |

The accompanying drawing represents a schematic flow diagram of the process and shows typical apparatus for carrying out the process of this invention.

The approximate composition of the crude ethanol feed which is fed to the purification system is as follows:

| | Percent |
|---|---|
| Ether | 7.5 |
| Oil | 0.5 |
| Alcohol | 58 |
| Water | 34 |

The crude feed is heated to about 200° F. in preheater 1 and fed continuously through pipe 2 to ether removal column 3 a rectifying column of approximately 40 trays operating at 15 p. s. i. g. pressure with the feed plate located at or near the midpoint of the column. Heat is supplied to the base of column 3 by live steam line 4 or, alternatively, by a closed steam coil and continuous fractional distillation of the crude ethanol feed is thereby effected. The temperature at the bottom of column 3 is maintained at about 200–220° F. Vapor boiling overhead from column 3 is removed through overhead line 5. The temperature at the top of column 3 is about 225–130° F. The vapor in line 5 is passed to condenser 6. The condensate from condenser 6 is predominately diethyl ether with some low boiling impurities, polymer oils and water. This ether stream is removed via line 7, and a major part of this stream is returned via line 8 to provide refluxing liquid for column 3. The remaining portion is withdrawn by line 9 as crude diethyl ether product which may be further purified and refined as desired.

Some of the polymer oil impurities present in the crude ethanol feed, particularly those which are more volatile than ethanol in the presence of aqueous ethanol solution, accumulate in column 3 as a non-aqueous phase at a point near or slightly above the feed point. These impurities are withdrawn from column 3 via line 10. They may be added to the bottom stream from column 3, added to oil impurities removed later in the processing, or they may be further processed separately. Dilute ethanol stripped of its more volatile impurities, particularly the predominant impurity diethyl ether as well as a small amount of polymer oils, is withdrawn from the base of 3 via line 11.

Stream 11 is passed through cooler 12 wherein it is cooled preferably to a temperature within the range of 75 to 150° F., and thence into decanter 13. It is desirable to add water to decanter 13. This is done to adjust the ethanol concentration to approximately 30–45 weight percent. Since, under these conditions certain of the hydrocarbon oil impurities become insoluble, it is much preferred to remove this insoluble phase. Thus, the diluted mixture is passed to decanter 13 where sufficient time is allowed to permit settling. The upper layer containing oil impurities, and other organic materials as well as some dissolved alcohol, are removed as the upper layer by line 14. The aqueous layer from decanter 13 containing essentially all of the ethanol is withdrawn through line 15 and is passed to pump 16 which discharges through line 17 to extractive distillation column 18. This column is preferably a distillation tower of about 45 plates and feed line 17 is positioned at or slightly above the midpoint. Dilution water is introduced into column 18 via line 19 at a point above the feed point, either at or near the top. Continuous extractive distillation is conducted in column 18. The water is introduced in such amounts to effect dilution and to modify and increase the volatilities of the organic compounds, particularly the remaining polymer oil impurities such that they can be readily removed from the alcohol by distillation. This water may be pure water or it can be an aqueous stream which is recycled from the bottom of the alcohol rectification column.

The feed to column 18 is preferably preheated prior to introduction to a temperature at or near that of the internal liquid reflux under equilibrium conditions of the tray located at the introduction position. This preheated feed may be introduced into column 18 either as total liquid, partial liquid and partial vapor or as total vapor. The column is operated with continuous introduction of alcohol feed, continuous introduction of water above the feed, and with sufficient heat provided to effect distillation throughout the column. The amount of water added is sufficient to reduce the ethanol concentration to 5 to 40 weight percent, and preferably 10 to 30 weight percent in the internal reflux. Operating thus, the purified aqueous ethanol fraction recovered as the bottoms stream is dissolved in and carried downward in the aqueous internal reflux. Steam is introduced into the base of 18 through line 20 or, alternatively, heat may be supplied to column 18 by means of a closed heating coil. Overhead vapors boiling from column 18 are carried by line 21 to condenser 22.

The remainder of the lighter oil impurities together with the aqueous ethanol vapors which distill from column 18 are removed in the overhead stream via line 21 and passed to condenser 22. The resulting condensate is then passed to decanter 24. By using sufficient dilution water, in column 18, the oil impurities distilled from 18 form an upper oil phase in decanter 24 and are withdrawn through line 25 for further treatment. The lower aqueous phase from 24 is returned to column 18 as reflux through line 26 or, alternatively, may be partially or totally withdrawn through line 27 as an overhead aqueous stream to remove any water soluble impurities present.

Bottoms product stream from column 18 containing the predominant part of the original ethanol in dilute aqueous solution of about 3 to 20 weight percent of ethanol and essentially free of all of its original impurities with the possible exception of a small amount of heavy hydrocarbon oils is withdrawn via line 28. From line 28 it is passed to pump 29 discharging through line 30 to rectifying column 31 having 60 to 70 trays. Heat is supplied to the base of column 31 through steam line 32 or alternatively it is supplied through a closed heating coil. In column 31, the purified aqueous alcohol is concentrated to the required strength. Vapors boiling overhead from 31 which consist of highly refined ethanol are passed by line 33 to condenser 34. The top temperature of the column is about 175° F. Condensed purified ethanol is withdrawn from condenser 34 through line 35. A part is returned to the top of column 31 through line 36 to provide reflux. Refined product alcohol free of foreign odors is withdrawn through line 37 or alternatively, the product is withdrawn as a side stream from column 31 through line 40, and a small overhead stream is withdrawn from line 36 and returned to column 3 to remove any volatile impurities which may pass into column 31 during periods of improper operation.

Any heavy oils which may accumulate near the feed tray of column 31 are withdrawn from above and below the feed plate through side connections 38 and pipe 41 for further processing. Water substantially free of alcohol is withdrawn from the base of column 31 through line 39.

This aqueous bottoms stream may also, if desired, be partially or totally recycled to extractive distillation column 18 and added via line 19.

The purified ethanol obtained thusly has been subjected to analysis and examined for odor characteristics. The data obtained show the products to have good odor and color characteristics and to be entirely clear on dilution.

What is claimed is:

1. In a method for purifying and refining crude aqueous ethanol produced by the hydration of an ethylene-containing stream, said crude ethanol containing both lower and higher boiling impurities, including diethyl ether and including malodorous organic impurities boiling above ethanol, which comprises the steps of continuously passing said crude aqueous ethanol into a fractional extractive distillation zone, continuously feeding water into said fractional extractive distillation zone at a point above the aqueous ethanol feed stream, maintaining an internal liquid reflux having an ethanol content of 5 to 40 weight percent within the zone below the water feed point, continuously removing from the upper portion of said extractive distillation zone a stream containing organic impurities including both lower and higher boiling materials, continuously removing from the lower portion of said extractive distillation zone a dilute aqueous ethanol stream, passing said aqueous ethanol stream to a concentrating, fractional distillation zone, and removing from an upper portion of said concentrating distillation zone a stream of purified ethanol, the improvement which comprises the steps of initially passing said crude aqueous ethanol into a fractional distillation zone, removing from the upper portion of said zone a stream containing lower boiling impurities including substantially all of the diethyl ether, removing from the lower portion of said zone an aqueous ethanol stream, and continuously passing said ether-free aqueous ethanol stream into the above-described fractional extractive distillation zone.

2. In a method for purifying and refining crude aqueous ethanol produced by the hydration of an ethylene-containing stream, said crude ethanol containing both lower and higher boiling impurities, including diethyl ether, and including malodorous organic impurities boiling above ethanol, which comprises the steps of continuously passing said crude aqueous ethanol into a fractional extractive distillation zone, continuously feeding water into said fractional extractive distillation zone at a point above the aqueous ethanol feed stream, maintaining an internal liquid reflux having an ethanol content of 5 to 40 weight percent within the zone below the water feed point, continuously removing from the upper portion of said extractive distillation zone a stream containing organic impurities including both lower and higher boiling materials, continuously removing from the lower portion of said second extractive distillation zone a dilute aqueous ethanol stream, passing said aqueous ethanol stream to a concentrating, fractional distillation zone, and removing from an upper portion of said concentrating distillation zone a stream of purified ethanol, the improvement which comprises the steps of initially passing said crude aqueous ethanol into a fractional distillation zone, removing from the upper portion of said zone a stream containing lower boiling impurities including substantially all of the diethyl ether, removing from the lower portion of said zone a liquid aqueous ethanol stream, continuously passing the ether-free aqueous ethanol stream into a phase separation zone wherein phase separation takes place, separating a non-aqueous upper layer containing a major portion of the organic malodorous impurities, separating an aqueous ethanol lower layer, and continuously passing said aqueous ethanol stream into the above-described fractional extractive distillation zone.

(References on following page)

References Cited in the file of this patent

UNITED STATES PATENTS

| | | |
|---|---|---|
| 2,551,625 | Morrell et al. | May 8, 1951 |
| 2,551,626 | Morrell et al. | May 8, 1951 |
| 2,610,141 | Drout | Sept. 9, 1952 |
| 2,635,992 | Carlson et al. | Apr. 21, 1953 |
| 2,648,711 | Carrier | Aug. 11, 1953 |
| 2,663,679 | Drout | Dec. 22, 1953 |
| 2,670,324 | Grekel et al. | Feb. 23, 1954 |

FOREIGN PATENTS

| | | |
|---|---|---|
| 60,199 | France | Mar. 24, 1954 |

(Addition to No. 1,006,439)

OTHER REFERENCES

Elements of Fractional Distillation by Robinson and Gilliland, 3rd Ed. (McGraw-Hill 1939), page 134.